(12) United States Patent
Li

(10) Patent No.: US 12,688,440 B2
(45) Date of Patent: Jul. 21, 2026

(54) IMPLEMENTATION OF MACHINE LEARNING STATE MACHINES

(71) Applicant: Deere & Company, Moline, IL (US)

(72) Inventor: Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 1246 days.

(21) Appl. No.: 17/408,845

(22) Filed: Aug. 23, 2021

(65) Prior Publication Data

US 2023/0059741 A1 Feb. 23, 2023

(51) Int. Cl.
G06N 5/04 (2023.01)
G06N 20/00 (2019.01)

(52) U.S. Cl.
CPC .............. G06N 5/04 (2013.01); G06N 20/00 (2019.01)

(58) Field of Classification Search
CPC .......... G06N 5/04; G06N 20/00; G06N 3/084; G06N 3/105; G06N 3/0442; G06N 3/0455; G06N 5/01; G06N 20/10; G06N 20/20; G06N 3/0464; G06N 3/042
See application file for complete search history.

(56) References Cited

U.S. PATENT DOCUMENTS 11,037,549 B1 * 6/2021 Kulkarni ............. G10L 15/1815
2021/0073632 A1 * 3/2021 Iyer ..................... G06F 18/2413

2021/0081836 A1 * 3/2021 Polleri ...................... G06F 8/77
2021/0158041 A1 * 5/2021 Chowdhary ......... G05D 1/0272
2022/0382800 A1 * 12/2022 Abraham ................ G06F 16/45

OTHER PUBLICATIONS

Tamilselvan , Srikanth G et al. "A Visual Programming Paradigm for Abstract Deep Learning Model Development." Proceedings of the 10th Indian Conference on Human-Computer Interaction. New York, NY, USA: ACM, 2019. 1-11. Web (Year: 2019).*
"What is the Azure Machine Learning designer?" Azure Machine Learning. Microsoft Docs. Retrieved from https://docs.microsoft.com/en-us/azure/machine-learning/concept-designer. Dated Jun. 11, 2021.

(Continued)

*Primary Examiner* — Daniel T Pellett
(74) *Attorney, Agent, or Firm* — Hanley, Flight & Zimmerman, LLC

(57) ABSTRACT

Implementations are disclosed for automated design and implementation of machine learning (ML) state machines that include at least some aspect of machine learning. In various implementations, unstructured input may be received from a user. The unstructured input may convey operational aspect(s) of a machine learning (ML) state machine desired by the user. The unstructured input may be semantically processed to determine an intent of the user. The intent may include the operational aspect(s) of the ML state machine desired by the user. Based on the intent of the user, a plurality of modular logical routines may be selected from an existing library of modular logical routines. At least one logical routine of the selected plurality of logical routines may include logical operations that process data using one or more machine learning models. The selected plurality of logical routines may be assembled into the desired state ML state machine.

18 Claims, 7 Drawing Sheets

(56)                          References Cited

OTHER PUBLICATIONS

Dudley et al., "A Review of User Interface Design for Interactive Machine Learning" ACM Transactions on Interactive Intelligent Systems, vol. 1, No. 1, Article 1. 37 Pages. Publication date: Mar. 2018.

"Kubeflow Overview: How Kubeflow helps you organize your ML workflow" KubeFlow. Retrieved from https://www.kubeflow.org/docs/started/kubeflow-overview/. 5 Pages. Dated Jun. 16, 2021.

Akshmi Narayana Santha, "AutoML-A GUI Application to Make ML for Everyone" Automated Machine Learning. Retrieved from https://towardsai.net/p/automl/automl%E2%80%8A-%E2%80%8A-gui-application-to-make-ml-for-everyone. 22 Pages. Dated Jun. 25, 2021.

Semi Koen, "Architecting a Machine Learning Pipeline How to build scalable ML systems" Retrieved from https://towardsdatascience.com/architecting-a-machine-learning-pipeline-a847f094d1c7. 22 Pages. Dated Jun. 25, 2021.

Sean McClure, "GUI-fying the Machine Learning Workflow: Towards Rapid Discovery of Viable Pipelines" Towards Data Science. Retrieved from https://towardsdatascience.com/gui-fying-the-machine-learning-workflow-towards-rapid-discover-of-viable-pipelines-cab2552c909f. 36 pages. Dated Jun. 25, 2018.

"Overview-Deep Learning Studio" Retrieved from https://docs.deepcognition.ai/overview. 2 pages. Dated May 10, 2021.

Tamilselvam et al., "A Visiual Programming Paradigm for Abstract Deep Learning Model Development" arXiv:1905.02486v2 [cs.HC] 12 Pages. Dated Aug. 19, 2019.

* cited by examiner

229

229

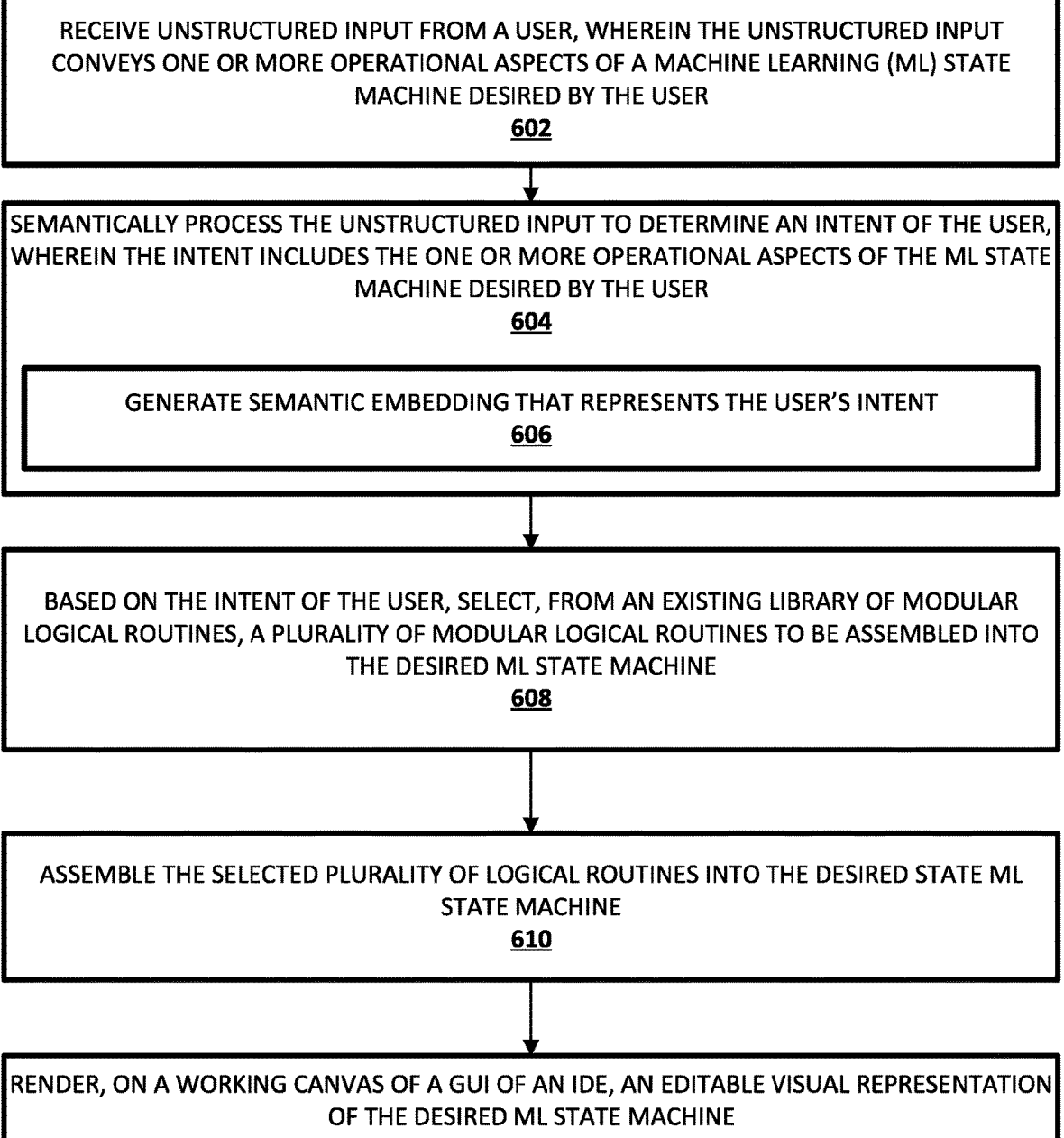

RECEIVE UNSTRUCTURED INPUT FROM A USER, WHEREIN THE UNSTRUCTURED INPUT CONVEYS ONE OR MORE OPERATIONAL ASPECTS OF A MACHINE LEARNING (ML) STATE MACHINE DESIRED BY THE USER
602

SEMANTICALLY PROCESS THE UNSTRUCTURED INPUT TO DETERMINE AN INTENT OF THE USER, WHEREIN THE INTENT INCLUDES THE ONE OR MORE OPERATIONAL ASPECTS OF THE ML STATE MACHINE DESIRED BY THE USER
604

GENERATE SEMANTIC EMBEDDING THAT REPRESENTS THE USER'S INTENT
606

BASED ON THE INTENT OF THE USER, SELECT, FROM AN EXISTING LIBRARY OF MODULAR LOGICAL ROUTINES, A PLURALITY OF MODULAR LOGICAL ROUTINES TO BE ASSEMBLED INTO THE DESIRED ML STATE MACHINE
608

ASSEMBLE THE SELECTED PLURALITY OF LOGICAL ROUTINES INTO THE DESIRED STATE ML STATE MACHINE
610

RENDER, ON A WORKING CANVAS OF A GUI OF AN IDE, AN EDITABLE VISUAL REPRESENTATION OF THE DESIRED ML STATE MACHINE
612

IMPLEMENTATION OF MACHINE LEARNING STATE MACHINES

BACKGROUND

Designing and implementing complex, machine learning-based data processing pipelines typically requires significant engineering effort, as well as expertise in data science and computer programming. These requirements may raise significant barriers to entry in industries where such expertise may be uncommon, such as in manufacturing, or in agriculture where farmers, growers, co-ops, etc., may still rely on human-based phenotyping of their crops. With the agricultural industry in particular, the rise of precision agriculture—enabled at least in part by increased capability, availability, and affordability of agricultural robots and unmanned aerial vehicles (UAVs)—has made machine learning-based phenotyping increasingly crucial to remain competitive. Agricultural personnel may desire phenotypical inferences quickly so that they can make responsive decisions and/or take remedial actions at a competitive pace.

SUMMARY

Implementations are described herein for automated design and implementation of machine learning (ML) state machines that include at least some aspect of machine learning. More particularly, but not exclusively, implementations are described herein for semantically processing an unstructured input from a user to determine the user's intent, including one or more operational aspects of a machine learning (ML) state machine. A ML state machine may then be automatically designed and/or implemented based on the user's intent.

In some implementations, a method may be implemented using one or more processors and may include: receiving unstructured input from a user, wherein the unstructured input conveys one or more operational aspects of a machine learning (ML) state machine desired by the user; semantically processing the unstructured input to determine an intent of the user, wherein the intent includes the one or more operational aspects of the ML state machine desired by the user; based on the intent of the user, selecting, from an existing library of modular logical routines, a plurality of modular logical routines to be assembled into the desired ML state machine, wherein at least one logical routine of the selected plurality of logical routines includes logical operations that process data using one or more machine learning models; and assembling the selected plurality of logical routines into the desired state ML state machine.

In various implementations, the semantic processing may include generating a semantic embedding based on the unstructured input, wherein the semantic embedding represents the user's intent, and the selecting is based on the semantic embedding. In various implementations, the selecting may be based on a comparison between the semantic embedding generated based on the unstructured input and a plurality of reference embeddings generated based on the existing library of logical routines.

In various implementations, the unstructured input may include one or more free-form natural language inputs provided by the user in response to one or more prompts. In various implementations, the unstructured input may include one or more digital images. In various implementations, the one or more digital images may be annotated to identify one or more instances of an object class, and the at least one logical routine may be selected based on one or more of the machine learning models having been trained to detect instances of objects in the object class.

In various implementations, the method may include rendering, on a working canvas of a graphical user interface (GUI) provided as part of an integrated development environment, an editable visual representation of the desired ML state machine. In various implementations, the visual representation of the desired ML state machine may include a graph with nodes representing the selected plurality of logical routines and edges representing logical couplings between the selected plurality of logical routines. In various implementations, the ML state machine may be an agricultural state machine, and the one or more machine learning models may include a phenotyping agricultural machine learning model.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 is a flowchart of an example method in accordance with various implementations described herein.

DETAILED DESCRIPTION

Figure 1:
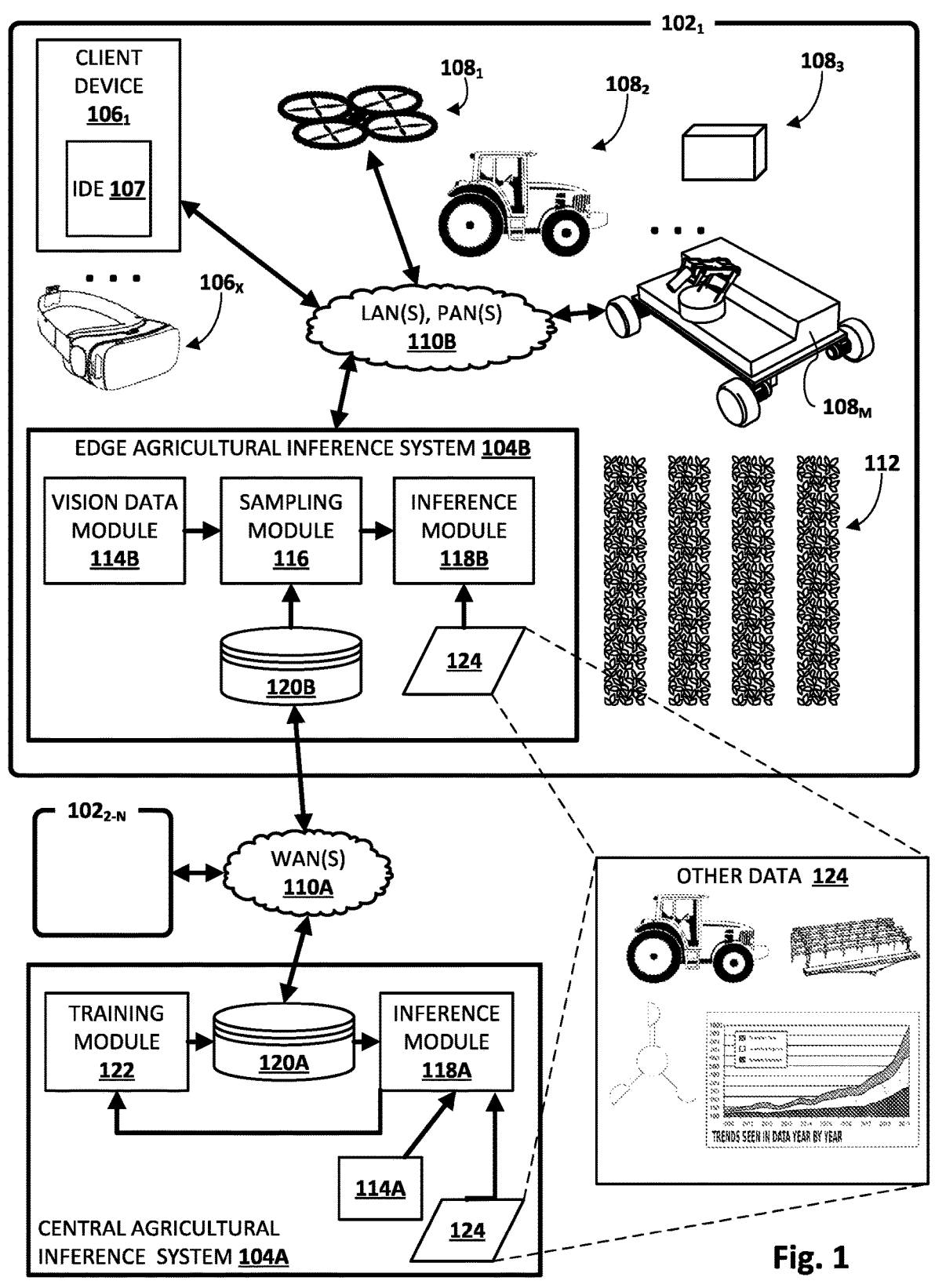
FIG. 1 schematically depicts an example environment in which disclosed techniques may be employed in accordance with various implementations.

Implementations are described herein for automated design and implementation of machine learning (ML) state machines that include at least some aspect of machine learning. More particularly, but not exclusively, implementations are described herein for semantically processing an unstructured input from a user to determine the user's intent, including one or more operational aspects of a ML state machine. A ML state machine may then be automatically designed, assembled, and/or implemented based on the user's intent.

In various implementations, a ML state machine generated using techniques described herein may be used to generate a computer program—written in an underlying programming and/or scripting language—that includes application of complex machine learning algorithm(s). In the agricultural domain, for instance, the ML state machine may be an agricultural ML state machine that includes at least one phenotyping agricultural machine learning model. Nonetheless, techniques described herein for automating the design and implementation of ML state machines free expert and non-expert users alike from these technical details, allowing them to design ML state machines in an intuitive manner, without requiring underlying data science or computer programming expertise.

In various implementations, a user may be able to design and/or implement a ML state machine, with or without the use of an integrated development environment (IDE) graphical user interface (GUI) described herein, by providing what will be referred to as "unstructured input" that conveys one or more operational aspects of the ML state machine the user desires. Unstructured input may be unconstrained from any enumerated list of options (e.g., menu selections) and/or from any formal syntactical requirements (e.g., doesn't need to comport with a programming language or command line syntax). Instead, unstructured input may be semantically processed to determine the user's intent, and hence, the one or more operational aspects of the desired ML state machine.

This semantic processing to determine the user's intent may be performed in various ways, depending on the nature of the unstructured input. In some implementations, this semantic processing may include generating a semantic embedding that represents, e.g., in embedding space, the one or more operational aspects of the ML state machine desired by the user. In some implementations, this semantic embedding may be compared to one or more reference semantic embeddings that represent a plurality of modular logical routines and/or complete ML state machines in a library. If the semantic embedding is sufficiently similar to a reference semantic embedding that matches an entire existing ML state machine, then that entire existing ML state machine may be selected, e.g., as a template or candidate ML state machine. Additionally or alternatively, one or more of the existing modular logical routines with underlying reference embeddings most similar to the semantic embedding may be selected and assembled—e.g., in accordance with various heuristics and/or ordered distributions of logical routines found in ML state machines historically—into a template ML state machine. In either case, the user may then be able to edit and/or execute the template ML state machine. Similarity between embeddings may be determined in various ways, such as Euclidian distance, cosine similarity, dot product, and so forth.

In some implementations in which the unstructured input is natural language input, the semantic processing may include natural language processing (NLP). For example, the natural language input may be parsed to extract keywords and/or phrases that can then be used to represent the user's intent. Additionally or alternatively, in some implementations, a semantic embedding may be generated as described above, e.g., using NLP-based techniques such as Word2vec, transformer networks (e.g., Bidirectional Encoder Representations from Transformers, or "BERT"), various types of recurrent neural networks such as long short-term memory (LSTM) networks or gated recurrent unit (GRU) networks, etc. As one example, a farmer might say or type, "I need to project strawberry yield for the northwest field." This may trigger generation of a semantic embedding that represents (e.g., encodes data indicative of) the user's intent/various operational parameters, e.g., "strawberry," "project," "yield," "northwest field".

In some implementations, natural language input may be solicited, e.g., using a questionnaire. For example, a user may be presented with a series of prompts that ask the user whether they are interested in particular inferences (e.g., plant traits). Based on these questions and/or the user's answers, ML state machines may be generated. In some instances, these data may be used, e.g., in conjunction with generated ML state machines, as training data for training one or more machine learning models to select logical routines and/or assemble the selected logical routines into a ML state machine.

Unstructured input is not limited to natural language input. Another example of unstructured input is digital images that are annotated or otherwise packaged with additional data (e.g., metadata) indicative of the user's intent. For example, suppose a farmer wishes to detect ripe strawberries in a field. The farmer may manually annotate one or more digital images of strawberry plants, e.g., by drawing (e.g., using a touch screen or a mouse input device) a bounding box around ripe strawberries, and leaving unripe strawberries unbounded (or bounded with annotations having different properties, such as shape, color, etc.). The digital images with annotations and/or additional data may be processed, e.g., using a machine learning model such as a convolutional neural network (CNN), to generate a semantic embedding that may then be compared to comparable reference semantic embeddings as described previously.

In some implementations, reference embeddings generated based on existing modular logical routines (or on entire ML state machines) may be encoded with data indicative of the (final or intermediate) output they generate, in addition to or instead of based on their structure. This output may include, for instance, digital images that were annotated based on a machine learning model (e.g., a CNN) utilized by the logical routine to detect particular classes of objects, such as types of fruit. In various implementations, when a user provides, as unstructured input, an annotated digital image, a semantic embedding generated based at least in part on that annotated image may be compared to the reference embeddings generated based on the output of the existing modular logical routines. The most similar N (positive integer) reference embeddings may represent those existing modular logical routines that are most likely to generate the same type of output.

In some implementations, multiple modalities of unstructured input may be used to determine a user's intent. For instance, a user may provide annotated image(s) along with natural language input that conveys details about what the user wants in their ML state machine. Suppose a user provides, as unstructured input, a digital image of strawberry plants that includes white bounding box(es) around ripe strawberr(ies), red bounding box(es) around unripe strawberr(ies), a blue bounding box around weeds, etc. The user may then provide natural language input such as "harvest strawberries like those in the white boxes, ignore strawberries like those in the red boxes, and spray herbicide on the plants in blue boxes." In various implementations, these multiple modalities of inputs may be processed, e.g., in parallel, in series, etc., to generate one or more semantic embeddings. In some implementations, multiple semantic embeddings may be generated—one for the natural language input and another for the annotated digital image—and combined to generate an aggregate embedding. This aggregate embedding may then be compared to reference embeddings that are generated based on existing ML state machines, modular logical routines, and/or accompanying natural language descriptions (e.g., curation provided by previous users, comments incorporated into metadata of the existing ML state machines or modular logical routines, etc.)

In some implementations, a ML state machine generated using techniques described herein may be presented by an IDE, e.g., by way of a GUI that includes a working canvas on which users are able to manipulate graphical elements representing the ML state machine. The arrangement of graphical elements may be used to generate source code that includes one or more machine learning operations. In some implementations, this source code may be written in a relatively low level programming language like C or C++, and may be compiled into an executable computer program. In other implementations in which the source code is a higher level scripting language, the source code may be interpreted (which may involve just-in-time compilation). In yet other implementations, the source code may be compiled into bytecode.

In some implementations, each graphical element may correspond to a logical routine that is intuitively understandable by non-experts and experts alike (e.g., agricultural personnel), such as "fruit counter," "crop yield predictor," and so forth. Each logical routine may include one or more logical operations (e.g., lines of code, commands, batch or command line commands, etc.) that may or may not be separable from each other (e.g., extractable from the logical routine). In some implementations, the graphical elements may be rendered as nodes that can be connected with edges that represent logical couplings between the logical routines underlying the nodes. For example, output of a first node may be provided as an input to a second node based on an edge that runs from the first node to the second node. In various implementations, the nodes and edges may be manipulable relative to each other, e.g., by dragging and dropping, resizing, moving, etc., to allow the user to make changes to the ML state machine. In some implementations, changes made to the ML state machine using the GUI may be used to train one or more of the machine learning models that were used to generate the ML state machine in the first place.

FIG. 1 schematically illustrates one example environment in which one or more selected aspects of the present disclosure may be implemented, in accordance with various implementations. The example environment depicted in FIG. 1 relates to the agriculture domain, which as noted previously is a beneficial domain for implementing selected aspects of the present disclosure. However, this is not meant to be limiting. Techniques described here may be useful in any domain that would benefit from allowing experts and non-experts alike to be able to create machine learning ML state machines. As one non-limiting example, scientists and researchers deployed in remote locations such as in space, in the Antarctic, in remote jungle regions, etc., may be experts in fields like physics, biology, chemistry, etc. However, they may only have surface-level understanding of how machine learning works. With techniques described herein for automatically generating ML state machines based on unstructured input, however, these scientists and researchers can create their own ML state machines without necessarily needing even from this surface knowledge.

The environment of FIG. 1 includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which agricultural inferences such as crop yield predictions may be of interest. Each edge site 102 may include the same or similar components as those depicted in FIG. 1 as part of edge site $102_1$.

In some implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network for which techniques described herein may be particularly beneficial. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 and some farm equipment 108 may operate a variety of different applications that may be used, for instance, to obtain and/or analyze various agricultural inferences (real time and delayed) that are made using on ML state machines generated using techniques described herein. For example, a first client device 106₁ operates integrated development environment (IDE) 107 (e.g., which may be standalone or part of another application, such as part of a web browser). Another client device 106ₓ may take the form of a HMD that is configured to render 2D and/or 3D data to a wearer as part of a VR immersive computing experience. For example, the wearer of client device 106ₓ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment 108₁₋ₘ may take various forms. Some farm equipment 108 may be operated at least partially autonomously, and may include, for instance, an unmanned aerial vehicle 108₁ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot 108ₘ, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor 108₂, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, farm equipment 108 may take the form of one or more modular edge computing nodes 108₃. An edge computing node 108₃ may be a modular and/or portable data processing device and/or sensor package that, for instance, may be carried through an agricultural field 112, e.g., by being mounted on another piece of farm equipment (e.g., on a boom affixed to tractor 108₂ or truck, or to a center pivot) that is traversed through field 112 and/or by being carried by agricultural personnel. Edge computing node 108₃ may include logic such as processor(s), application-specific integrated circuits (ASICs), field-programmable gate arrays (FPGA), etc., configured with selected aspects of the present disclosure, e.g., such as ML state machines generated using techniques described herein.

In some examples, one or more of the components depicted as part of edge agricultural inference system 104B may be implemented in whole or in part on a single edge computing node 108₃, across multiple edge computing nodes 108₃, and/or across other computing devices, such as client device(s) 106. Thus, when operations are described herein as being performed by/at edge agricultural inference system 104B, it should be understood that those operations may be performed by one or more edge computing nodes 108₃, and/or may be performed by one or more other computing devices at the edge 102, such as on client device(s) 106.

In various implementations, edge agricultural inference system 104B may include a vision data module 114B, a sampling module 116, and an edge inference module 118B. Edge agricultural inference system 104B may also include one or more edge databases 120B for storing various data used by and/or generated by modules 114B, 116, and 118B, such as vision and/or other sensor data gathered by farm equipment 108₁₋ₘ, agricultural inferences, ML state machines that are generated and/or implemented using techniques described herein, and so forth. In some implementations one or more of modules 114B, 116, and/or 118B may be omitted, combined, and/or implemented in a component that is separate from edge agricultural inference system 104B.

In various implementations, central agricultural inference system 104A may be implemented across one or more computing systems that may be referred to as the "cloud." Central agricultural inference system 104A may receive massive sensor data generated by farm equipment 108₁₋ₘ (and/or farm equipment at other edge sites 102₂₋ₙ) and process it using various techniques, including but not limited to application of ML state machines generated using techniques described herein, to make agricultural inferences.

However, the agricultural inferences generated by central agricultural inference system 104A may be delayed, e.g., by the time required to physically transport portable data devices (e.g., hard drives) from edge sites 102₁₋ₙ to central agricultural inference system 104A, and/or by the time required by central agricultural inference system 104A to computationally process this massive data. Agricultural personnel (e.g., farmers) at edge sites 102 may desire agricultural inferences much more quickly than this. Accordingly, in various implementations, aspects of ML state machines built using disclosed techniques may be implemented at edge agricultural inference system 104B if possible/feasible, and at central agricultural central system 104A if necessary/beneficial.

In some implementations, sampling module 116 may be configured to sample, e.g., from one or more sensors onboard one or more farm equipment 108₁₋ₘ, or from vision data provided by vision data module 114B, sensor data. Sampling module 116 may provide this sampled sensor data to edge inference module 118B. In some implementations, the sensor data may be applied, e.g., continuously and/or periodically by edge inference module 118B, as input for ML state machines stored in edge database 120B to generate output indicative of one or more targeted plant traits detected in/on one or more plants in the agricultural field 112.

Edge agricultural inference system 104B may process the targeted inference data at the edge using one or more of the machine learning models stored in database 120B, e.g., based on an agricultural ML state machine designed by a user using IDE 107. In some cases, one or more of these machine learning model(s) and/or ML state machines may be stored and/or applied directly on farm equipment 108, such as edge computing node 108₃, to make a targeted inference about plants of the agricultural field 112.

As noted previously, various types of machine learning models may be applied by inference modules 118A/B, e.g., during implementation of ML state machines, to generate various agricultural inferences. Additionally, various types of machine learning models may be used to generate embeddings that are applied as input across the various machine learning models. These various models may include, but are not limited to, RNNs, LSTM networks (including bidirectional), transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Figures 2A, 2B:
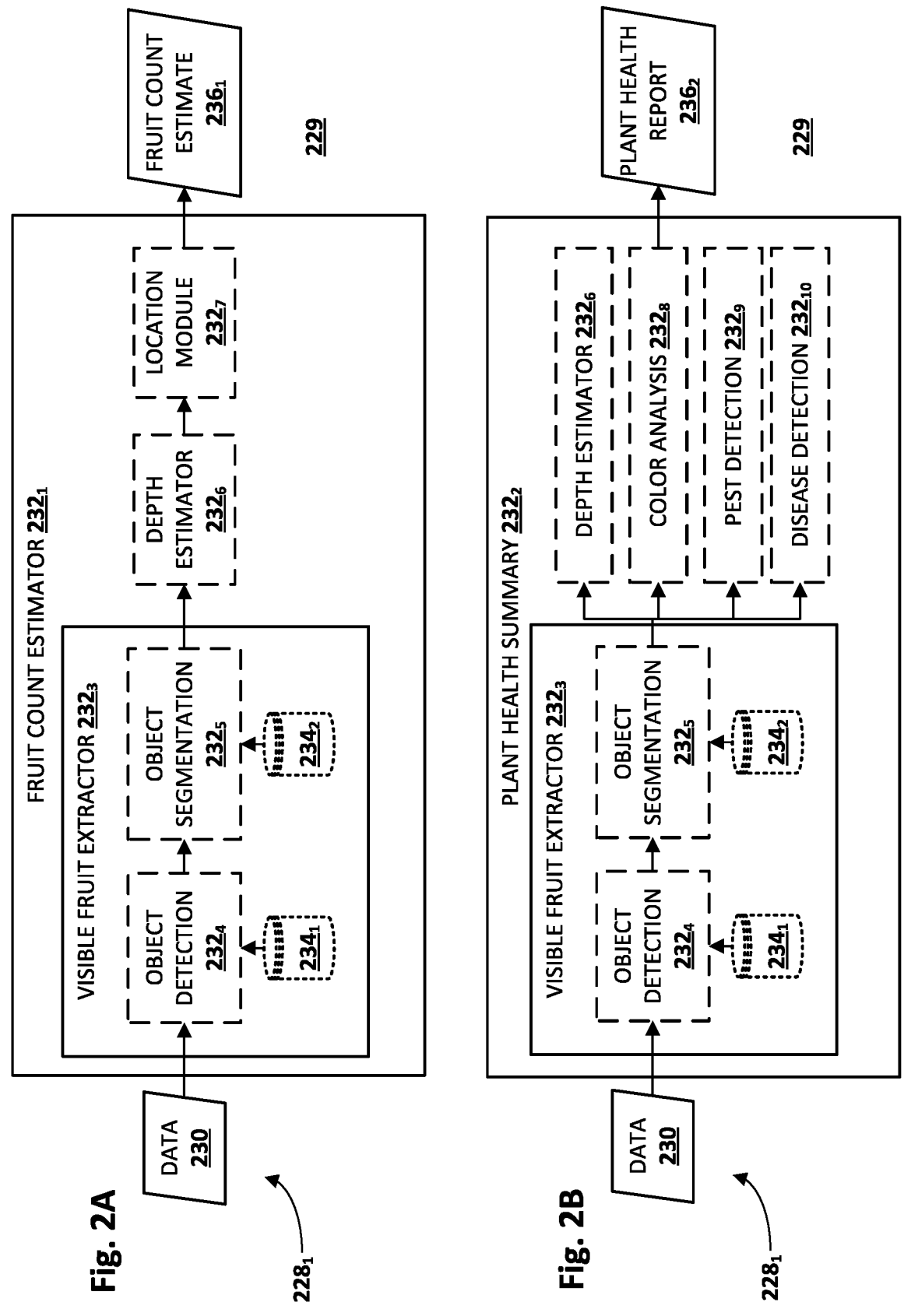
FIG. 2A and FIG. 2B schematically depict multiple examples of editable visual representations if agricultural state machines generated in accordance with selected aspects of the present disclosure.

FIGS. 2A and 2B schematically depict an example of manipulable visual representations of ML state machines that may be presented to a user, e.g., on a working canvas 229 of a GUI of IDE 107. FIG. 2A depicts a first agricultural state machine $228_1$ and FIG. 2B depicts a second agricultural state machine $228_2$. FIGS. 2A and 2B demonstrate how relatively complex concepts such as machine learning may be encapsulated into intuitive, hierarchical elements such as a "Fruit Count Estimator" logical routine $232_1$ and a "Plant Health Summary" logical routine $232_2$ at a relatively high level, and/or a "Visible Fruit Exactor" logical routine $232_3$ at a lower level. In FIGS. 2A-B, data 230 may take the form of, for instance, vision data captured by a vision sensor that is carried through one or more fields. This vision data 230 may depict crops from various angles (e.g., overhead, from the side, etc.) and/or in various resolutions and/or wavelengths.

With first ML state machine $228_1$ in FIG. 2A, data 230 is first processed by Visible Fruit Extractor logical routine $232_3$, which itself includes an object detection logical routine $232_4$ and an object segmentation logical routine $232_5$. Object detection logical routine $232_4$ may utilize one or more machine learning models, such as a CNN $234_1$, to identify one or more objects, such as fruits, flowers, nuts, etc. These identifications may take various forms, such as bounding shape annotations. Object segmentation logical routine $232_5$ may be configured to segment objects, such as those contained in bounding boxes added by object detection logical routine $232_4$ to generate pixel-wise annotations. Object segmentation logical routine $232_5$ may or may not also rely on one or more machine learning models, such as another CNN 2342. Fruit Count Estimator logical routine $232_1$ at large may be designed to estimate a current count of fruit in a particular location, such as field 112. Accordingly, downstream of visible fruit extractor logical routine $232_3$ are a depth estimator logical routine $232_6$ and a location module logical routine $232_7$.

Depth estimator logical routine $232_6$ may be configured to analyze vision data 230 to estimate one or more distances (e.g., a distribution of distances) between one or more vision sensors and one or more aspects of crops and/or areas surrounding crops. For example, if the vision sensor captures crops from overhead, depth estimator logical routine $232_6$ may estimate depths to visible portions of crops and/or to the ground. From these depth estimations, depth estimator logical routine $232_6$ (or another, un-depicted logical routine) may, for instance, extrapolate total fruit counts for a plant based on a height of the plant (calculated using a difference between a distance to a top of the plant's canopy and the ground) and a count of visible fruits (e.g., those fruit that are visible from overhead, not occluded by leaves or other fruit) in one or more frames of vision data.

Location module logical routine $232_7$ may be configured to cluster fruit count estimates based on geographic locations. For example, fruit count estimates associated with individual frames of vision data 230 may be clustered based on geo-coordinates (e.g., GPS coordinates) associated with those frames. In this way, Fruit Count Estimator $232_1$ is able to generate a fruit count estimate $236_1$ for a particular geographic area, such as a field, a part of a field such as a row, etc.

Plant Health Summary logical routine $232_2$ operates on the same data 230 as Fruit Count Estimator logical routine $232_1$. Instead of estimating fruit counts, however, Plant Health Summary logical routine $232_2$ is configured to generate a plant health report 2362 that includes various pieces of data and/or inferences indicative of plant health. To this end, Plant Health Summary logical routine $232_2$ also includes a visible fruit extractor logical routine $232_3$, same as Fruit Count Estimator $232_1$. However, the downstream logical routines are different. Plant Health Summary logical routine $232_2$ provides input data for various logical routines, including depth estimator logical routine $232_6$, color analysis logical routine $232_8$, pest detection logical routine $232_9$, and disease detection logical routine $232_{10}$.

Depth estimator logical routine $232_6$ may perform a similar role as it performed in Fruit Count Estimator logical routine $232_1$, except that an aspect of its output, plant height, may be used as a measure of plant health. Color analysis logical routine $232_8$ may be configured to analyze colors of fruits that were detected by objection detection logical routine $232_4$ and segmented by object segmentation logical routine $232_5$. Additionally or alternatively, color analysis logical routine $232_8$ may be configured to analyze color of non-fruit parts of plants or their surroundings (e.g., pixels of vision data 230 not annotated as fruit), such as leaves, flowers, stems, underlying dirt, etc.

Pest detection logical routine $232_9$ may be configured to detect pest infestation (e.g., by detecting the pests and/or the damage they cause), e.g., on segmented fruit portions of vision data 230 or on portions (e.g., pixels) of vision data 230 not annotated as fruit. Pests or may include, for instance, various types of insects (e.g., aphids), snails and slugs, mammals such as deer, birds (which may damage or totally destroy fruit), and so forth. Disease detection logical routine $232_{10}$ may perform a similar role as pest detection logical routine $232_9$, except it may detect diseases (e.g., fungus, bacteria, viruses, etc.). In some implementations, one or both of pest detection logical routine $232_9$ and disease detection logical routine $232_{10}$ may utilize one or machine learning models (not depicted) such as CNNs to detect pests and/or disease, although this is not required.

As noted previously, in various implementations, the working canvases 229 of FIGS. 2A and 2B may be usable to create, edit, manipulate, or otherwise act upon graphs (undirected or directed) that define ML state machines such as $228_{1-2}$. In some implementations, the graphical elements forming these graphs, including the nodes, may be drawn (e.g., dragged) from a library of available logical routines at various hierarchical levels. The elements in these libraries may be defined to be relatively intuitive, and may abstract out the underlying complexities of computer programming, machine learning, and/or data science from non-experts who may not understand it or be confused by it.

In FIGS. 2A and 2B, for instance, the node representing Fruit Count Estimator logical routine $232_1$ and the node representing Plant Health Summary logical routine $232_2$ may be two of several different nodes that are available to agricultural personnel. These various nodes may be used in isolation and/or logically coupled with each other using edges. In some implementations, nodes that are dependent on particular data being available may not be allowed to be logically coupled upstream from other nodes that make that particular data available. For example, without visible fruit extractor logical routine $232_3$, it may not be possible to use depth estimator logical routine $232_6$ and location module logical routine $232_7$ alone to define a state machine; such an attempt may result in the user receiving an error message.

With techniques described herein, graphs representing ML state machines, such as those depicted in FIGS. 2A-B, may be generated, at least in part, automatically based on unstructured input from a user. In some implementations, one or more machine learning models (e.g., various types of graph neural networks) may be trained to map graphs representing desired ML state machines to unstructured training input, and vice versa. For example, a user may provide natural language input and/or one or more annotated images as training data, along with a graph representing a ML state machine desired by the user. The unstructured input may be processed using a machine learning model capable of generating output that is in graph form (e.g., a graph neural network), or that can be readily converted to graph form (e.g., a graph may be flattened into a matrix, and such a matrix may be converted back into a graph), to generate a graph representing a ML state machine. Then, the graph generated based on the machine learning model may be compared to the desired graph provided by the user. To the extent these graphs differ (e.g., error is detected), the machine learning model may be trained using techniques such as back propagation, gradient descent, etc.

Figure 3:
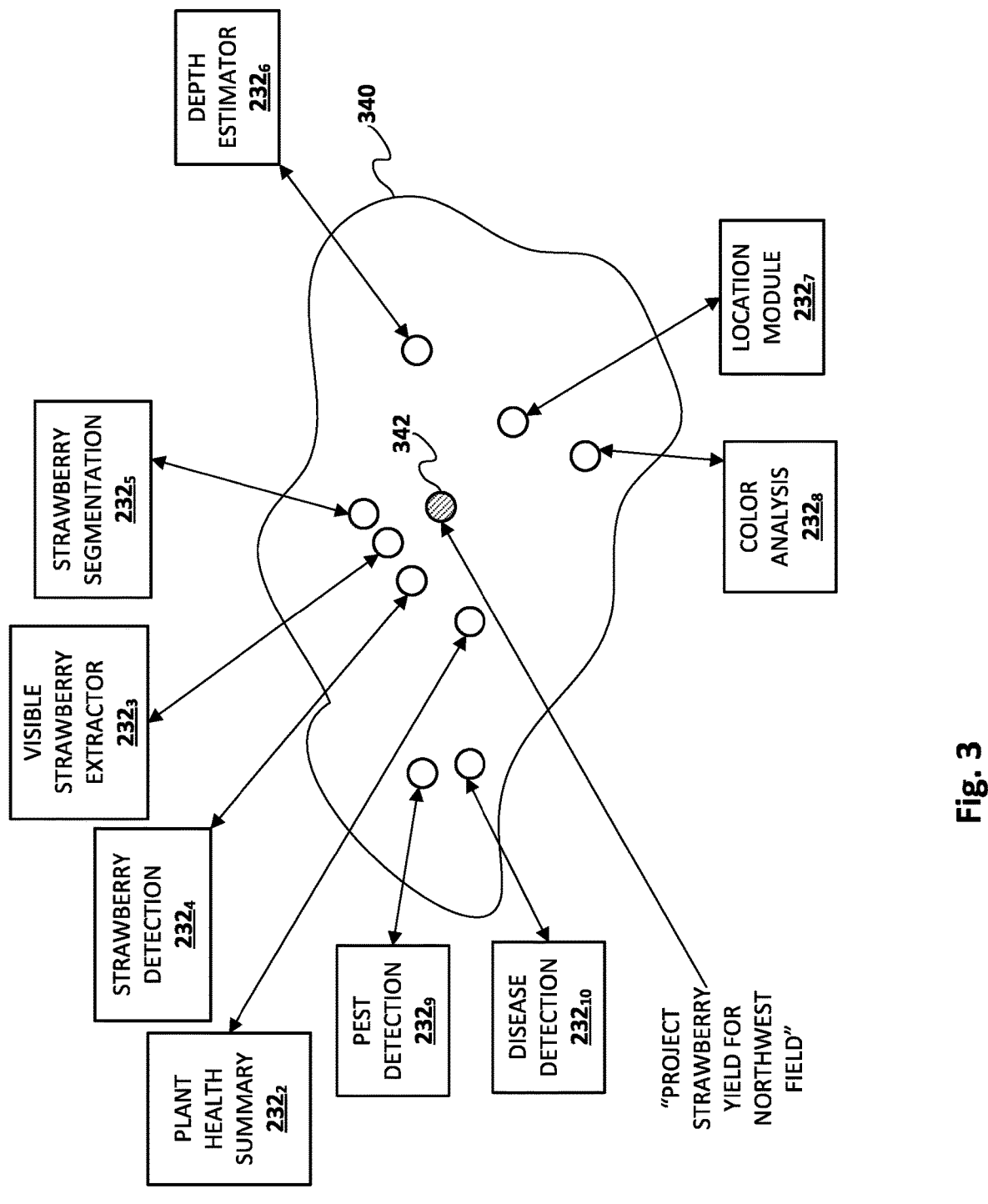
FIG. 3 schematically depicts an example of how unstructured input in the form of natural language input may be mapped into an embedding space to facilitate automatic generation of a machine learning state machine.

FIG. 3 schematically depicts one example of how unstructured input in the form of natural language input may be mapped to an embedding space 340, and how those mappings may be used to generate ML state machines, in accordance with various implementations. While embedding space 340 is depicted in two dimensions for readability and to facilitate understanding, it should be understood that embedding space 340 may include any number of dimensions, e.g., such as the number of dimensions used to generate semantic embeddings from unstructured input.

Several of the logical routines $232_{1-10}$ from FIGS. 2A-B are depicted in FIG. 3 (in this case applicable specifically to strawberries), along with arrows that represent mappings of these routines to embeddings (white circles) within embedding space 340. Semantically-similar logical routines have embeddings that are depicted as being closer to each other in embedding space 340. However, similarity is not limited to Euclidian distance in embedding space 340. Similarity in embedding space 340 may be determined using other techniques as well, such as cosine similarity, dot product, etc. As an example, embeddings of strawberry detection logical routine $232_4$ and strawberry segmentation routine $232_5$ are clustered relatively close to each other because they are similar to each other (both annoted the same fruit in different ways). The embedding of visible strawberry extractor logical routine $232_3$ is in between the embeddings for $232_4$ and $232_5$. This is because visible strawberry extractor logical routine $232_3$ includes both logical routines $232_4$ and $232_5$.

In FIG. 3, a natural language input has been issued, "Project strawberry yield for northwest field." Natural language processing techniques such as Word2vec, transformer networks, various types of recurrent neural networks (e.g., long short-term memory, gated recurrent unit), etc., may be used to generate semantic embedding(s) based on this natural language input. In some implementations, the natural language input may be parsed into logical portions. For example, the natural language input could be parsed into two portions: "Project strawberry yield . . . " and " . . . for northwest field," but this not required.

In FIG. 3, the natural language input "Project strawberry yield for northwest field" has been processed to generate a first semantic embedding 342 within embedding space 340. It can be seen that first semantic embedding 342 is approximately equidistant from the embeddings representing logical routines $232_{3-5}$. This is because logical routines $232_{2-5}$ represent logical routines (strawberry detection, visible strawberry extractor, strawberry segmentation) that are all semantically similar to the natural language input and that are in fact integral parts of the fruit count estimator logical routine $232_1$ in FIG. 2A.

It can also be seen that first semantic embedding 342 is relatively close to the embeddings representing depth estimator logical routine $232_6$ and location module $232_7$. This is because depth estimator logical routine $232_6$ and location module $232_7$ are also are also integral parts of the fruit count estimator logical routine $232_1$, as shown in FIG. 2A. Accordingly, in various implementations, a ML state machine maybe assembled using some combination of logical routines $232_{3-7}$ that are selected based on their similarity to first embedding 342.

Figure 4:
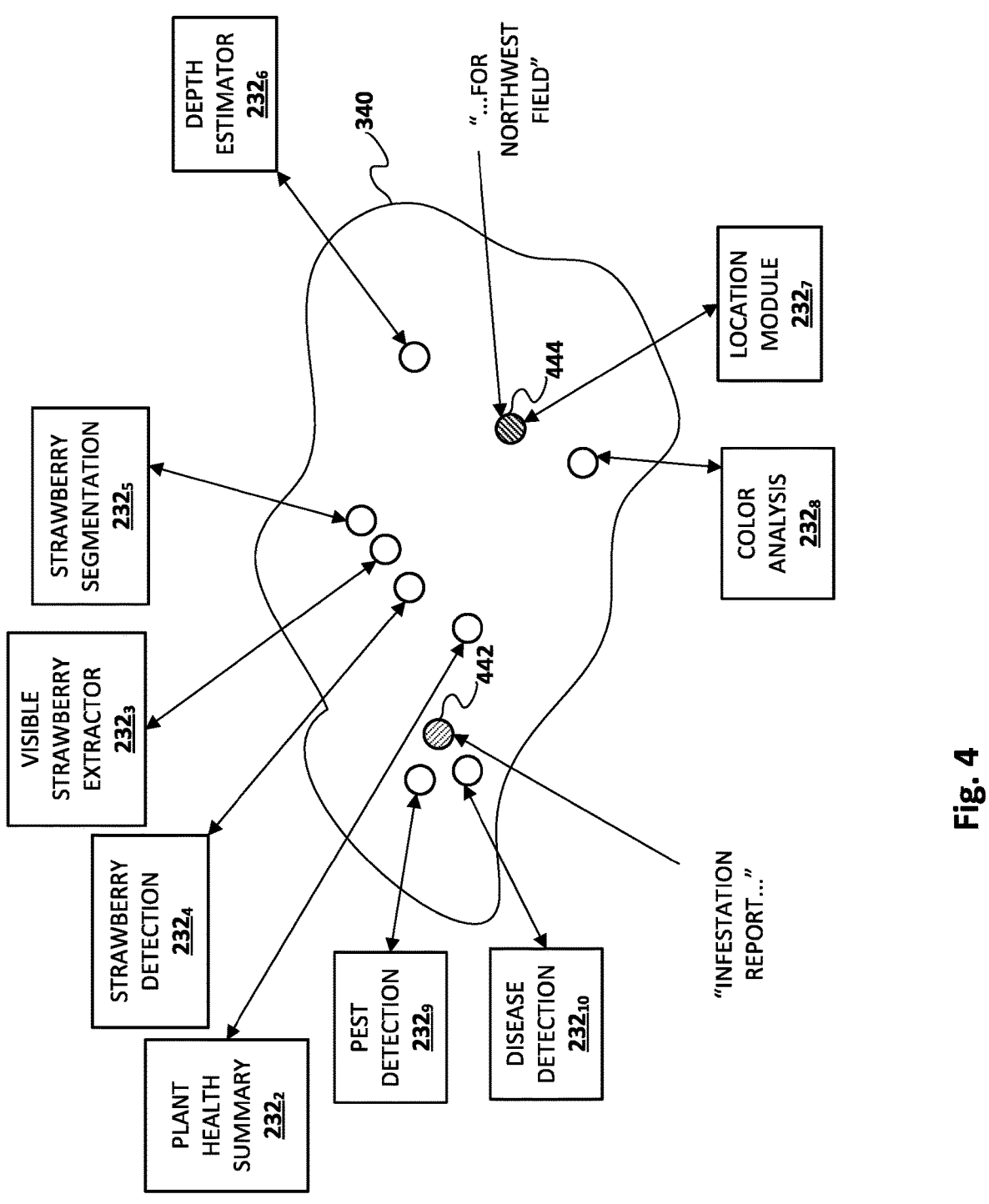
FIG. 4 schematically depicts another example of how unstructured input in the form of natural language input may be mapped into an embedding space to facilitate automatic generation of a machine learning state machine.

Another example is demonstrated by FIG. 4, which depicts the same embedding space 340 as FIG. 3. In FIG. 4, the natural language command, "Infestation report for northwest field" has been provided by a user. In this example, the user's natural language input has been broken up into two portions: "Infestation report . . . " and " . . . for northwest field." A first semantic embedding 442 has been generated for the first portion ("Infestation Report . . . "). It can be seen that first semantic embedding 442 is approximately equidistant from (and thus approximately equally similar to) the embeddings representing both pest detection logical routine $232_9$ and disease detection logical routine $232_{10}$. Thus, in some implementations, both these logical routines $232_{9-10}$ may be selected for assembly into a ML state machine.

The second portion (" . . . for northwest field") maps to a second semantic embedding 444 that coincides with location module $232_7$. Accordingly, location module $233_7$ may also be selected for the ML state machine. In some implementations, rules or heuristics may govern the order in which selected logical routines 232 are assembled into a ML state machine. Alternatively, a corpus of historical ML state machines may be analyzed to learn ordered distributions of logical routines within individual ML state machines, and those ordered distributions may be used to select orders for logical routines to be used in newly-assembled ML state machines.

Figure 5:
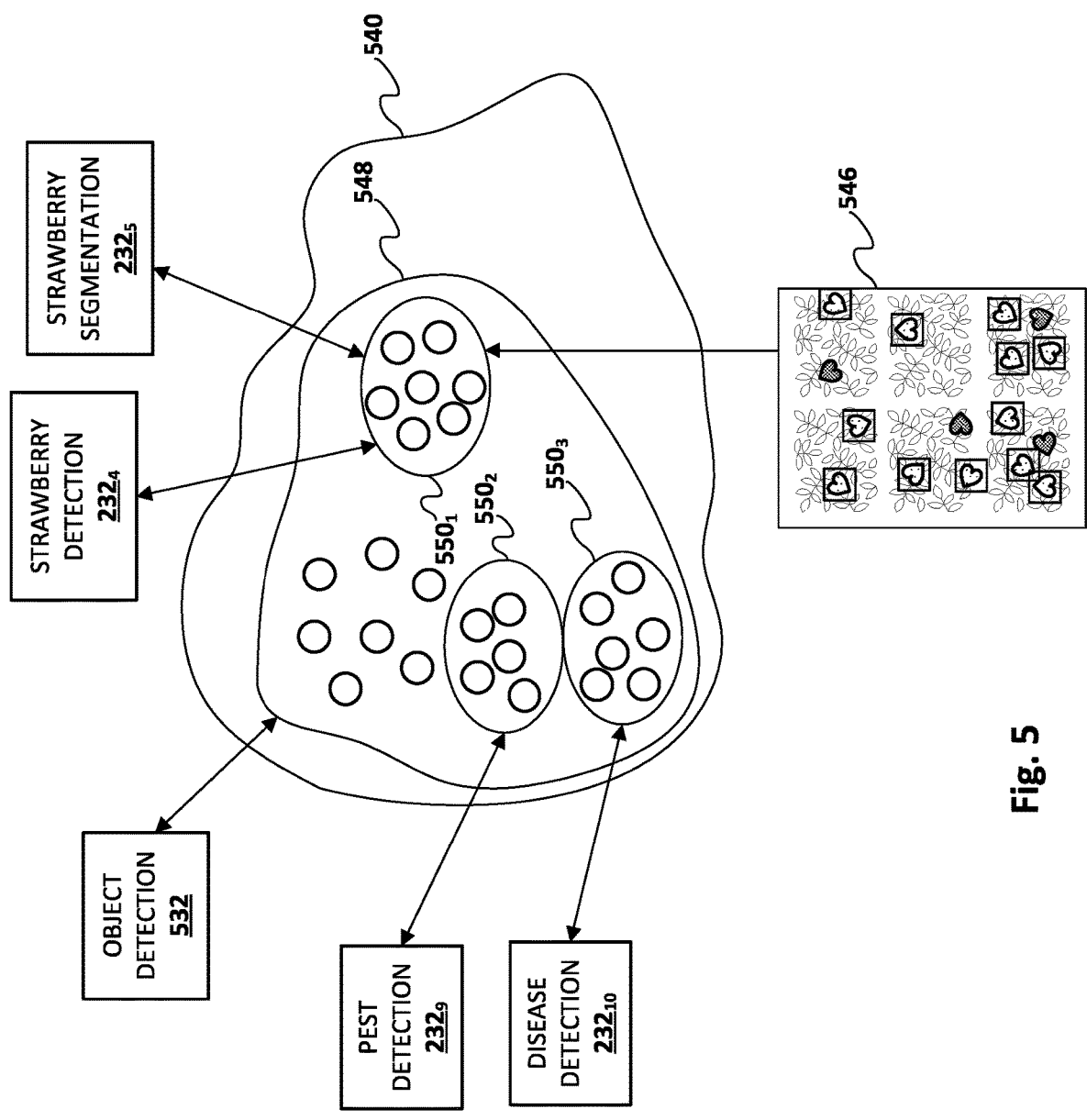
FIG. 5 schematically depicts an example of how unstructured input in the form of annotated imagery may be mapped into an embedding space to facilitate automatic generation of a machine learning state machine.

As noted previously, unstructured input is not limited to natural language input. FIG. 5 depicts an example in which unstructured input in the form of a digital image 546 is provided. As can be seen in FIG. 5, digital image 546 is annotated with bounding boxes that encompass strawberries of a particular color (e.g., ripe red strawberries). Other strawberries of a different color (e.g., unripe green strawberries) are not annotated.

An embedding space 540 includes, as white circles, a variety of embeddings that represent some of the logical routines described previously, as well as a more general object detection logical routine 532. An object detection embedding subspace 548 captures semantic embeddings representing any sort of logical routine for object recognition. Within object detection embedding subspace 548 are some number of additional subspaces, including a first subspace $550_1$ that corresponds to a cluster of embeddings that includes embeddings that representing strawberry detection logical routine $232_4$ and strawberry segmentation logical routine $232_5$. A second embedding subspace $550_2$ corresponds to a cluster of embeddings representing various types of pest detection logical routines, including pest detection logical routine $232_9$. A third embedding subspace $550_3$ corresponds to a cluster of embeddings representing various types of disease detection logical routines, including $232_{10}$.

It can be seen that annotated digital image 546 maps most closely to the cluster of embeddings in first embedding subspace $550_1$. Intuitively, the annotations included in digital image 546 represent a desired output (bounding boxes around ripe strawberries). Thus, a semantic embedding generated based on digital 546, e.g., using a machine learning model such as a CNN, may be closest in embedding space 540 with embeddings representing logical routines that generate semantically similar output.

FIG. 6 illustrates a flowchart of an example method 600 for practicing selected aspects of the present disclosure. For convenience, operations of method 600 will be described as being performed by a system configured with selected aspects of the present disclosure. Other implementations may include additional operations than those illustrated in FIG. 6, may perform operation(s) of FIG. 6 in a different order and/or in parallel, and/or may omit one or more of the operations of FIG. 6.

At block 602, the system may receive unstructured input from a user. The unstructured input may convey one or more operational aspects of a ML state machine desired by the user. For example, the user may provide natural language input describing operational aspects the ML state machine they desire, or the user may provide an example of output (e.g., annotated digital images, numeric output, example statistics, a summary plant health report, etc.) that the user would like to be generated by their requested ML state machine.

At block 604, the system may semantically process the unstructured input to determine an intent of the user. This user intent may include the one or more operational aspects of the ML state machine desired by the user. In some implementations, the semantic processing of block 604 may include, at block 606, generating a semantic embedding that represents the user's intent. For instance, natural language input may be processed using machine learning models such as Word2vec, transformer networks, various types of recurrently neural networks, etc. Imagery input may be processed using, for instance, CNNs.

Based on the intent of the user determined at block 604, at block 608, the system may select, from an existing library of modular logical routines, a plurality of modular logical routines to be assembled into the desired ML state machine. At least one logical routine of the selected plurality of logical routines may include logical operations that process data using one or more machine learning models.

At block 610, the system may assemble the selected plurality of logical routines into the desired state ML state machine. As noted previously, the assembly of block 610 may be performed in various ways. In some implementations, heuristics may govern, and may, for instance, prevent a first logical operation that is dependent on a second logical operation from being implemented upstream of the second logical operation. Alternatively, in some implementations, ordered distributions of modular logical routines forming past ML state machines may be learned, e.g., as part of a machine learning model, to predict most likely orders of modular logical routines for a ML state machine under assembly.

At block 612, the system may render, e.g., on a working canvas provided by a GUI of IDE 107, an editable representation of the desired ML state machine, similar to those depicted in FIGS. 2A and 2B. The user may be able to accept and/or edit the presented ML state machine. In some implementations, feedback provided by the user, whether in the form of explicit comments (e.g., "that's not correct," "the order is reversed") or in the form of the user editing the ML state machine, may be used to continue training various machine learning models that are employed as part of the pipeline for generating ML state machines.

Figure 7:
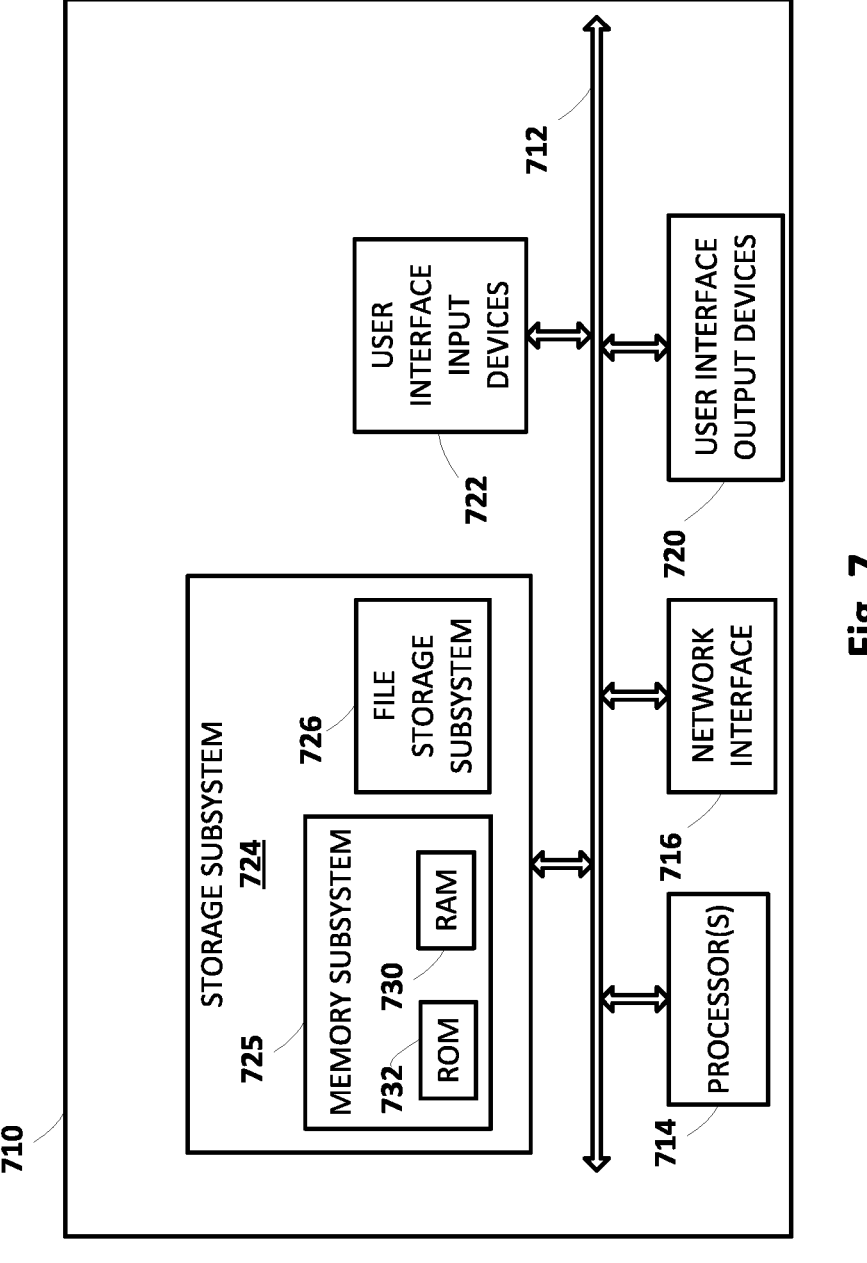
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method 600 described herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:

receiving unstructured input from a user, wherein the unstructured input conveys one or more operational aspects of a machine learning (ML) state machine desired by the user;

generating a semantic embedding to determine an intent of the user, wherein the intent includes the one or more operational aspects of the ML state machine desired by the user, wherein the semantic embedding represents the one or more operational aspects of the ML state machine desired by the user in a first embedding space;

determining a similarity between the semantic embedding and a reference embedding, wherein the reference embedding represents an output of a modular logical routine in a second embedding space;

based on the similarity between the semantic embedding and the reference embedding, selecting, from an existing library of modular logical routines, a plurality of modular logical routines to be assembled into the desired ML state machine including the modular logical routine of the reference embedding, wherein at least one logical routine of the selected plurality of logical routines includes logical operations that process data using one or more machine learning models;

assembling the selected plurality of logical routines into the desired state ML state machine;

rendering, on a working canvas of a graphical user interface (GUI) provided as part of an integrated development environment, an editable visual representation of the desired ML state machine; and training the one or more machine learning models based on user feedback received via the GUI, wherein the user feedback causes the desired ML state machine to train the one or more machine learning models in response to manipulation of graphical elements representing at least one of an edge or a node in relation to each other.

2. The method of claim 1, wherein the semantic processing includes generating the semantic embedding based on the unstructured input.

3. The method of claim 2, wherein the selecting is based on a comparison between the semantic embedding generated based on the unstructured input and a plurality of reference embeddings generated based on the existing library of logical routines.

4. The method of claim 1, wherein the unstructured input includes one or more free-form natural language inputs provided by the user in response to one or more prompts.

5. The method of claim 1, wherein the unstructured input includes one or more digital images.

6. The method of claim 5, wherein the one or more digital images are annotated to identify one or more instances of an object class, and the at least one logical routine is selected based on one or more of the machine learning models having been trained to detect instances of objects in the object class.

7. The method of claim 1, wherein the visual representation of the desired ML state machine includes a graph with nodes representing the selected plurality of logical routines and edges representing logical couplings between the selected plurality of logical routines.

8. The method of claim 1, wherein the ML state machine includes an agricultural state machine, and the one or more machine learning models include a phenotyping agricultural machine learning model.

9. A system comprising one or more processors and memory storing instructions that, in response to execution of the instructions, cause the one or more processors to:

receive unstructured input from a user, wherein the unstructured input conveys one or more operational aspects of a machine learning (ML) state machine desired by the user;

generate a semantic embedding to determine an intent of the user, wherein the intent includes the one or more operational aspects of the ML state machine desired by the user, wherein the semantic embedding represents the one or more operational aspects of the ML state machine desired by the user in a first embedding space;

determine a similarity between the semantic embedding and a reference embedding, wherein the reference embedding represents an output of a modular logical routine in a second embedding space;

based on the similarity between the semantic embedding and the reference embedding, select, from an existing library of modular logical routines, a plurality of modular logical routines to be assembled into the desired ML state machine including the modular logical routine of the reference embedding, wherein at least one logical routine of the selected plurality of logical routines includes logical operations that process data using one or more machine learning models;

assemble the selected plurality of logical routines into the desired state ML state machine;

render, on a working canvas of a graphical user interface (GUI) provided as part of an integrated development environment, an editable visual representation of the desired ML state machine; and train the one or more machine learning models based on user feedback received via the GUI, wherein the user feedback causes the desired ML state machine to train the one or more machine learning models in response to manipulation of graphical elements representing at least one of an edge or a node in relation to each other.

10. The system of claim 9, including instructions to generate the semantic embedding based on the unstructured input.

11. The system of claim 10, wherein the selecting is based on a comparison between the semantic embedding generated based on the unstructured input and a plurality of reference embeddings generated based on the existing library of logical routines.

12. The system of claim 9, wherein the unstructured input includes one or more free-form natural language inputs provided by the user in response to one or more prompts.

13. The system of claim 9, wherein the unstructured input includes one or more digital images.

14. The system of claim 13, wherein the one or more digital images are annotated to identify one or more instances of an object class, and the at least one logical routine is selected based on one or more of the machine learning models having been trained to detect instances of objects in the object class.

15. The system of claim 9, wherein the visual representation of the desired ML state machine includes a graph with nodes representing the selected plurality of logical routines and edges representing logical couplings between the selected plurality of logical routines.

16. The system of claim 9, wherein the ML state machine includes an agricultural state machine, and the one or more machine learning models include a phenotyping agricultural machine learning model.

17. A non-transitory computer-readable medium comprising instructions that, in response to execution of the instructions by a processor, cause the processor to:

receive unstructured input from a user, wherein the unstructured input conveys one or more operational aspects of a machine learning (ML) state machine desired by the user;

generate a semantic embedding to determine an intent of the user, wherein the intent includes the one or more operational aspects of the ML state machine desired by the user, wherein the semantic embedding represents the one or more operational aspects of the ML state machine desired by the user in a first embedding space;

determine a similarity between the semantic embedding and a reference embedding, wherein the reference embedding represents an output of a modular logical routine in a second embedding space;

based on the similarity between the semantic embedding and the reference embedding, select, from an existing library of modular logical routines, a plurality of modular logical routines to be assembled into the desired ML state machine including the modular logical routine of the reference embedding, wherein at least one logical routine of the selected plurality of logical routines includes logical operations that process data using one or more machine learning models;

assemble the selected plurality of logical routines into the desired state ML state machine;

render, on a working canvas of a graphical user interface (GUI) provided as part of an integrated development environment, an editable visual representation of the desired ML state machine; and train the one or more machine learning models based on user feedback received via the GUI, wherein the user feedback causes the desired ML state machine to train the one or more machine learning models in response to manipulation of graphical elements representing at least one of an edge or a node in relation to each other.

18. The non-transitory computer-readable medium of claim 17, including instructions to generate the semantic embedding based on the unstructured input.

* * * * *